United States Patent [19]

Fuminier et al.

[11] 4,435,894
[45] Mar. 13, 1984

[54] DUCTILE CAST IRON PIPE HAVING CONSTRICTED END CASING

[75] Inventors: Claude Fuminier; Michel Pierrel, both of Pont-a-Mousson, France

[73] Assignee: Pont-A-Mousson S.A., Nancy, France

[21] Appl. No.: 348,580

[22] Filed: Feb. 12, 1982

Related U.S. Application Data

[62] Division of Ser. No. 146,736, May 2, 1980, Pat. No. 4,330,015.

[30] Foreign Application Priority Data

May 17, 1979 [FR] France .................. 79 12559

[51] Int. Cl.³ .......................... B22D 11/126
[52] U.S. Cl. .................. 29/527.5; 164/302; 164/76.1; 164/114; 72/367
[58] Field of Search .......... 29/517, 237, 527.5, 29/527.6, 527.4, 527.2, 527.1, 527.7; 138/109; 277/207 A, 207 R, DIG. 2; 72/367, 369, 368; 285/31, 335, 344; 164/302, 76.1, 114

[56] References Cited

U.S. PATENT DOCUMENTS

| | | | |
|---|---|---|---|
| 2,245,421 | 6/1941 | von Frankenberg | 29/527.5 |
| 2,410,813 | 11/1946 | Dillon | 72/369 |
| 2,857,666 | 10/1958 | Beyer | 72/367 |
| 3,977,227 | 8/1976 | Noble | 29/527.5 |

Primary Examiner—Howard N. Goldberg
Assistant Examiner—V. K. Rising
Attorney, Agent, or Firm—Sughrue, Mion, Zinn, Macpeak and Seas

[57] ABSTRACT

The invention provides a pipe or similar tubular member of ductile cast iron having an end casing. The thin walled casing has a curved profile at its entrance divided into two sections, of which one is formed by centrifugal casting, whereas the other, of lesser curvature, is made by hot or cold forming with a simultaneous axial compression and a radial bending directed towards the axis of the pipe. The invention is useful for forming fluid tight seals in pipelines using radial compression packings.

3 Claims, 8 Drawing Figures

DUCTILE CAST IRON PIPE HAVING CONSTRICTED END CASING

This is a division of application Ser. No. 146,736, filed May 2, 1980, and now U.S. Pat. No. 4,330,015, issued May 15, 1982.

The present invention relates to pipes or tubular members made of ductile cast iron or spheroidal graphite (nodular) cast iron obtained by centrifugal casting and provided with an end casing having a smooth internal surface and a constriction at its entrance.

Casings of this type in which the constriction is in the form of an inturned collar or a restriction are known for steel, aluminium and plastic pipes. The inturned collar or restriction can be made by hot or cold deformation. The collar can equally well be obtained by molding and then placed in the end of the casing and fixed rigidly thereto, the casing not being deformed. When formed by deformation, the casing and collar are of unitary construction. When the collar is molded separately, the casing is in two parts.

Such a collar or end restriction for a casing defines in the casing a recess for receiving a fluid-tight packing of simple form, for example torroidal or prismatic, in an assembly of pipes, and prevents this packing from being expelled in the event of an over pressure of the fluid contained in the pipe. It can also help, in the case of plastic pipes, to make the casing more rigid and therefore conserve its shape which facilitates assembly.

Hitherto, the constrictions at the entrance to casings of ductile cast iron pipes have been made directly by centrifugal casting using a core having a special shape which creates an internal circular shoulder at the entrance of the casing. However, for large scale manufacture, certain requirements, particularly dimensional tolerances, make it necessary to make the wall of the casing much thicker than that of the main portion or barrel of the pipe.

The object of the invention is to provide a pipe of ductile cast iron comprising a casing which is lighter and easier to make, that is a casing having a thin and smooth wall for which the entrance collar is obtained by deformation. This problem is difficult to resolve because ductile cast iron, although deformable, has elongation characteristics substantially inferior to those of steel or aluminium, or even to a plastic material such as rigid polyvinylchloride. There is therefore a high risk, if one is seeking to employ a classical casing for fluid type packings of simple form, for example torroidal or prismatic, that rupturing or tearing will occur on the external surface of the casing in the zone of maximum flexing of the thin wall of the casing.

Accordingly, the present invention provides a pipe or similar tubular member of ductile cast iron having an end casing with a constriction at its entrance, said casing having a wall thickness which is substantially constant and substantially equal to that of the main barrel portion of the pipe or tubular member, said casing having at its entrance a median profile in the form of two successive curved sections, one said section adjacent the entrance of the casing having a curvature substantially less than that of the other said section.

The invention also has as its object a method for making such a pipe or tubular member of spheroidal graphite cast iron and provided with an end casing. This method is characterized in that a pipe having a preformed casing is formed by centrifugal casting using a end casing shell and a corresponding casing mandrel with an annular space provided between them having, from the entrance of the casing, a first convergent rectilinear profile followed by a second convexly curved profile, and then, after removal of the centrifuged pipe from the mold, the part having a rectilinear profile is inwardly turned towards the axis of the pipe to progressively form a restriction by exerting on the end of the preformed part a force which comprises an axial component and a radial component directed towards the axis of the pipe.

This form of casing and this method of manufacture allow, surprisingly, pipes of spheroidal graphite cast iron to be obtained economically which have a thin walled casing of unitary construction not susceptible to tearing and in which the spheroidal graphite structure is preserved.

The invention will now be described in more detail, by way of example only, with reference to the accompanying drawings, in which.

Figure 1:
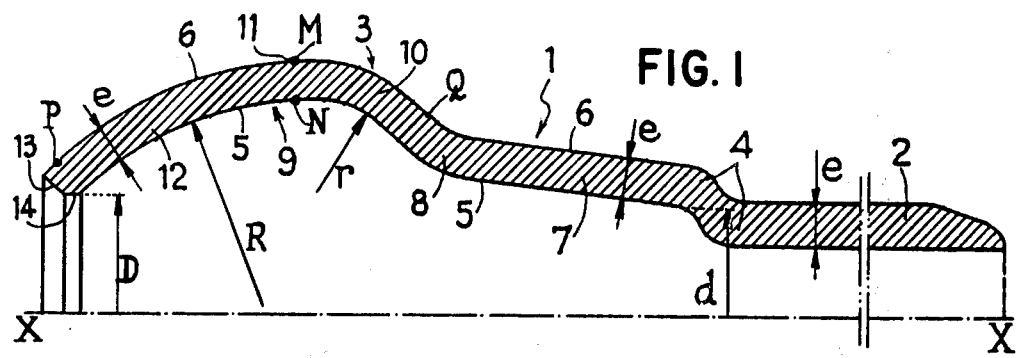
FIG. 1 is a half view in median section of a ductile cast iron pipe with a casing in accordance with an embodiment of the invention.

The pipe 1 of spheroidal graphite or ductile cast iron shown in FIG. 1, cast by centrifugation about an axis XX, comprises a barrel portion 2 of substantial length, which for convenience of illustration is broken in two and of which only a small part is shown, and a casing 3 connected to the barrel portion by rounded portions 4 of small radius of curvature and opposed concavities.

The casing 3, which has at all points substantially the same wall thickness e as the barrel portion 2, has an internal surface 5 and an external surface 6 which are completely smooth and free of sharp edges. This casing comprises several successive parts which will be described hereafter from the base of the casing towards its entrance.

At the base of the casing, a truncated conical part 7, which diverges towards the exterior of the casing at a relatively small angle, is connected to the rounded portions 4. An entrance recess 9 of the casing for receiving a fluid-tight packing is connected to this part 7 by a wide concave rounded portion 8.

The recess 9 is itself composed of two successive parts having a curved convex profile. A part 10 extends from the rounded portion 8 to the circle 11 of greatest diameter of the casing and of which the radius of curvature r is moderate. This radius r is a multiple of the thickness e, for example, in the order of three times e. A part 12 extends from the circle 11 to the entrance of the casing and is connected tangentially to the part 10. The radius of curvature R of this part 12 is distinctly greater than that of the radius of curvature r defined above.

The end face 13 of the part 12 is frusto-conical, converging towards the base of the casing and approximately perpendicular to the free ends of the surfaces 5 and 6. This face 13 terminates, at end of least diameter, in a short cylinder 14 lying along the axis XX and of which the diameter D is substantially less than the maximum diameter of the casing but at least equal to the smallest diameter d of the frusto-conical section 7.

The two parts 10 and 12 of the casing entrance form thus an unsymmetrical profile having two curves, one being relatively large for the interior part 10, and the other being small for the exterior part 12. The profile of the two parts 10 and 12, that is to say of the casing 3 in the neighborhood of its entrance, can be compared to that of an aerodynamic deflector for an automobile.

In order to obtain the casing described above, one proceeds in the following manner (FIGS. 2 and 3):

A pipe $1^a$ having an end providing a casing preform $3^a$ is formed by centrifugal casting. After removing from the cast, this preform is given its final shape by simultaneous axial compression and bending by means of a die having at least in part the desired shape.

Figure 2:
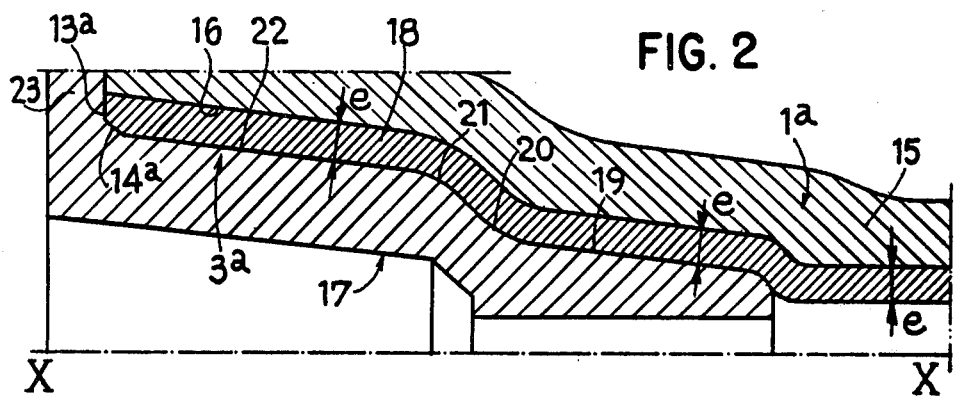
FIG. 2 is a partial half view in median section of a preformed casing obtained by centrifugal casting.

According to the embodiments shown in FIG. 2, the pipe 1 is obtained from a metal centrifugation mold or shell 15 having at its casing end a hollow impression which defines exactly the external profile of the rounded portion 4, the tapered section 7, the rounded portions 8 and the part 10 of the pipe 1. However, slightly before reaching the circle 11, the impression in the cell is in the form of a frusto-cone 16 which diverges towards its free end approximately according to the same angle of taper as the tapered section 7, which gives to the casing preform $3^a$ the shape of a very elongated S.

At this end of the shell is fixed, in a known manner and not shown, a hollow casing mandrel 17 rigid in rotation with the shell 15. The profile of the external surface of the mandrel 17 corresponds to that of the internal shape of the shell and forms with the latter an annular space 18 of which the width, measured in an approximately radial direction, is constant and corresponds to the thickness e of the pipe 1 to be obtained. From the base towards the entrance of the casing, the hollow mandrel 17 has thus a frusto-conical end or nose 19 with a rounded extremity which corresponds to the tapered section 7 of the pipe, a concave connecting section 20 which corresponds to the rounded portion 8, a second convex connecting section 21 which corresponds to the part 10, a frusto-conical tapered section 22 corresponding to the second frusto-conical portion 16 of the shell, and a radial external flange 23 for fixing against the shell providing the end face $13^a$ of the preform 13 which is internally bevelled at $14^a$.

By centrifugation, a pipe $1^a$ with a casing preform $3^a$ is cast in the shell 15 provided with the mandrel 17. The pipe $1^a$ is then removed from the mold and the preform $3^a$ (FIGS. 2 and 3) has at its entrance a frusto-conical taper $12^a$ followed by a curved section 10, a rounded connecting portion 8 and a tapered section 7.

Figure 3:
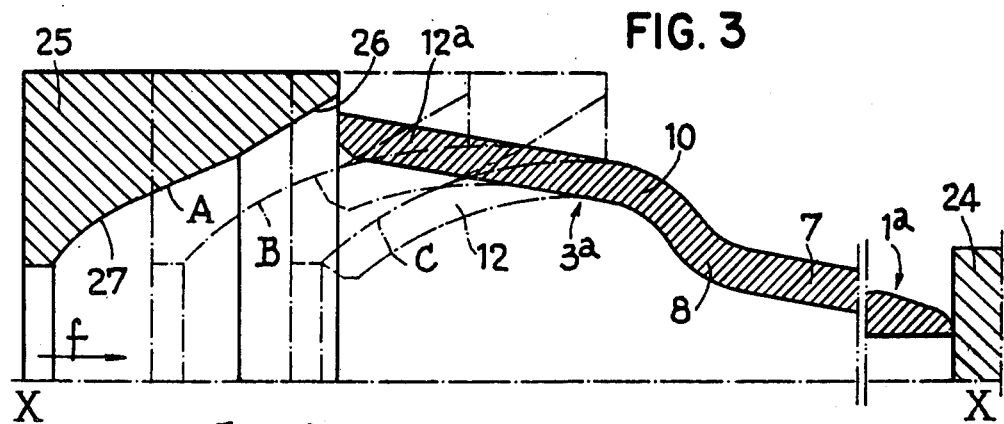
FIG. 3 is a diagrammatic half view showing the bending into shape of the molded preform of FIG. 2.

After cooling, the pipe 1 is placed in a press, for example, horizontally (but it could be vertically) of which the frame is not shown. This press comprises a fixed plate 24 against which the end face of the male end of the barrel 2 abuts, and a die 25 fixed on a jack not shown (of the screw or fluid pressure type) placed near the end face of the casing preform $3^a$ (FIG. 3). The die 25 has a widely tapering frusto-conical entrance 26 having a entrance diameter greater than the external diameter of the end face of the preform $3^a$. This entrance converges to its connection, with an appropriate transition, with a concave curved profile wall 27 having a decreasing diameter, of which the curvature is equal to that of the second part 10 of the casing 3 to be obtained.

With the aid of this press, by actuating the die jack 25, the jack can be slowly moved along the axis X—X in the direction of the arrow f, the plate 24 being fixed. A progressive axial compression and bending action is thus exerted simultaneously on the preform $3^a$. Under this action, the preform evolves progressively towards the final shape of the casing in the following manner.

The die 25 engages its entrance 26 on the end face of the preform $3^a$ (FIG. 3: position A in full lines) without initially deforming it. Then, progressively, the die exerts on the end face 13 an axial force which is accompanied by a bending force towards the axis X—X. This progressive bending force is slow and impresses an increasing curvature on the rectilinear generatrices of the frusto-conical surface $12^a$ (position B in chain dotted lines). In continuing its advance, the die 25 causes the end of the preform $3^a$ to penetrate the curved profile cavity 27. The axial travel continues thereby to exert a peripheral bending force on the whole of the circumference of the preform, of which the frusto-conical tapered section $12^a$ finishes by following completely the curvature of the cavity 27 (position C in chain dotted lines). At this moment, the die 25 is stopped by controlling the driving jack. The pipe 1 of FIG. 1 is therefore finished.

It will be noted that the first curved section 10 cast from the casing has undergone no deformation except in the immediate vicinity of the circle 11. Furthermore, the maximum bending force has been exerted in a circular zone situated at the connection of the first curved section of the preform $3^a$ and of the casing 3 with the second initially frustoconical part $12^a$ of the preform $3^a$, now become a curve following the shape 12. No tearing or splitting has occurred in this region of maximum bending which is situated at the circle of maximum diameter of the casing. This good result is attributed to the fact that the radial bending force exerted by the die 25 is continuously accompanied by an axial compression force in the direction of the arrow f.

Figure 5:
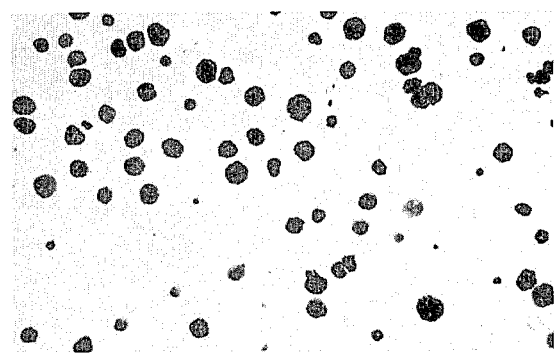
FIGS. 5 and 6 are microphotographs enlarged three hundred times showing the structure of the casing respectively at the exterior and interior edge of the casing zone where the flexing constraints are at a maximum.
Figure 6:
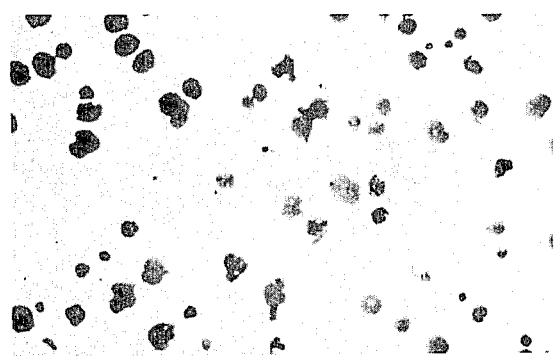

Microphotographs enlarged three hundred times have been taken at the exterior edge (point M in FIG. 5) and the interior edge (point N in FIG. 6) of the region of maximum bending. These microphotographs show that no fissures have occurred at these points, nor indeed tearing in the walls, and that the graphite remains spheroidal.

Figure 7:
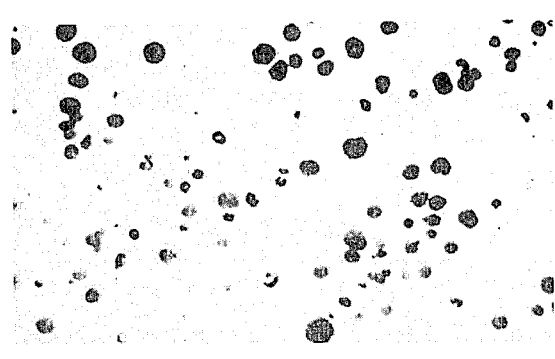
FIG. 7 is a microphotograph at the same enlargement of a point situated at the exterior edge of the entrance of the casing in a region of the casing which is deformed but not situated in the zone of maximum flexing.

Another microphotograph (FIG. 7) has been taken at a point P situated at the exterior edge of the entrance of the casing 3 which has undergone a deformation of greater amplitude than at the points M and N but has been subjected to a smaller bending force. The graphite here also has remained spheroidal.

Figure 8:
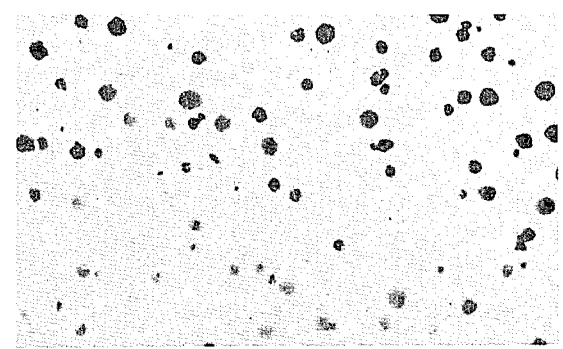
FIG. 8 is a microphotograph at the same enlargement showing the structure at a point at the exterior edge of the non-deformed part of the casing.

Finally, a microphotograph (FIG. 8) has been taken at a point Q situated at the exterior edge of the nondeformed part 10. This shows the spheroidal graphite structure obtained by centrifugal casting and serves as a comparison reference for other microphotographs.

The assembly of microphotographs of FIGS. 5 to 8 shows that the structure of the pipe, which was originally spheroidal graphite, has not suffered during cold deformation in the press 24–25.

Figure 4:
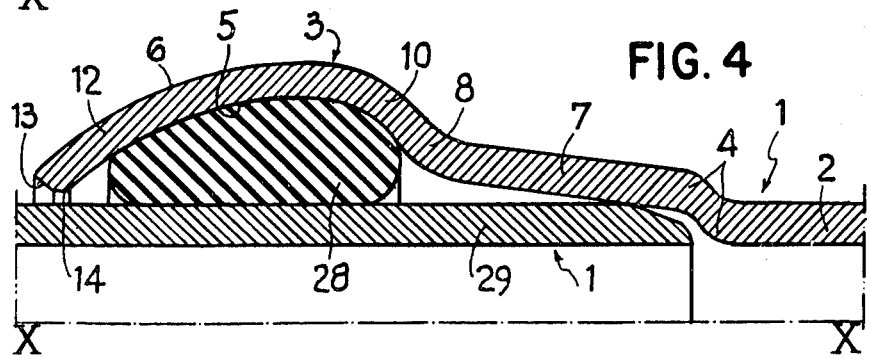
FIG. 4 is a half view in section of a fluid type assembly between the male end of a pipe and the casing of the pipe of FIG. 1.

FIG. 4 shows a fluid-tight assembly between two pipes of ductile cast iron such as the pipe 1. This assembly is of known type having a radial compression packing.

A free torroidal fluid-tight packing 28 is arranged in the recess 9 of the entrance of the casing 3 of one of the two pipes and bears elastically against the curved part 10 formed by molding and the curved part 12 formed in the press. The male end 29 of the other type penetrates the packing 28, passing through the cylindrical entrance with little play, and extends within the interior of the tapered surface 7 until it abuts against the base of the casing (interior part of the surface 7 or rounded portion 4). The packing 28 is squashed radially between the male end 29 and the casing 3 and is practically imprisoned in this position owing to the fact that it abuts against the wall 10 and the small annular space remaining free between the entrance of the casing and the external surface of the male end 29.

In the example above, the press forming of the casing 3 has been carried out on the preform $3^a$ in the cold. However, this forming can also take place hot in the same press with the aid of an appropriate sleeve, the frusto-conical part $12^a$ of the preform $3^a$, the neighboring part 10, not intended to be deformed, remaining cold.

The embodiments of the invention in which an exclusive property or privilege is claimed are defined as follows:

1. A method of making a pipe or similar tubular member of ductile cast iron having an end casing, comprising the steps of: making by centrifugal casting a pipe with a casing preform using an end casing shell and a corresponding casing mandrel, the shell and mandrel forming between them an annular space having, starting from the entrance of the casing, a first converging rectilinear profile followed by a second convex curved profile; and, subsequently, after removing the centrifuged from the mold, progressively deforming the rectilinear profile so as to curve it towards the axis of the pipe by exerting a force on the end of the preform which has an axial component and a radial component directed towards the axis of the pipe.

2. A method according to claim 1, wherein the force is exerted by means of a die which has a converging entrance followed by a converging wall defining the curved profile of lesser curvature of the casing.

3. A method according to claim 2, wherein the entrance of the die is frusto-conical.

* * * * *